United States Patent
Vitunic et al.

(10) Patent No.: US 8,791,644 B2
(45) Date of Patent: Jul. 29, 2014

(54) OFFSET CORRECTION CIRCUIT FOR VOLTAGE-CONTROLLED CURRENT SOURCE

(75) Inventors: Mark Robert Vitunic, Lexington, MD (US); Edward Lloyd Henderson, Atkinson, NH (US)

(73) Assignee: Linear Technology Corporation, Milpitas, CA (US)

( * ) Notice: Subject to any disclaimer, the term of this patent is extended or adjusted under 35 U.S.C. 154(b) by 2399 days.

(21) Appl. No.: 11/091,467

(22) Filed: Mar. 29, 2005

(65) Prior Publication Data

US 2006/0226898 A1    Oct. 12, 2006

(51) Int. Cl.
*G05F 1/00*    (2006.01)

(52) U.S. Cl.
USPC ........................................... 315/291

(58) Field of Classification Search
USPC .......... 315/291, 307, 299, 300, 302; 330/252, 330/253, 254, 257, 259; 362/227, 276, 800
See application file for complete search history.

(56) References Cited

U.S. PATENT DOCUMENTS

| | | | |
|---|---|---|---|
| 4,818,896 A * | 4/1989 | Cavanna | 326/90 |
| 5,473,529 A * | 12/1995 | Bohme | 363/127 |
| 5,486,788 A * | 1/1996 | Schlager et al. | 330/9 |
| 5,508,656 A * | 4/1996 | Jaffard et al. | 330/9 |
| 6,111,367 A | 8/2000 | Asano et al. | |
| 6,114,844 A * | 9/2000 | Chang et al. | 323/281 |
| 6,167,242 A | 12/2000 | Henderson et al. | |
| RE37,452 E * | 11/2001 | Donnelly et al. | 327/255 |
| 6,515,434 B1 * | 2/2003 | Biebl | 315/291 |
| 6,531,907 B2 | 3/2003 | Dooley et al. | |
| 6,552,612 B1 * | 4/2003 | Wilson | 330/254 |
| 6,577,183 B1 * | 6/2003 | Nakamura et al. | 330/9 |
| 6,628,165 B1 | 9/2003 | Henderson et al. | |
| 6,674,322 B2 * | 1/2004 | Motz | 330/9 |
| 6,701,094 B1 * | 3/2004 | Radomsky et al. | 398/182 |
| 6,734,723 B2 * | 5/2004 | Huijsing et al. | 330/9 |
| 6,798,293 B2 * | 9/2004 | Casper et al. | 330/258 |
| 6,822,501 B2 * | 11/2004 | Kinugasa | 327/307 |
| 6,944,438 B2 * | 9/2005 | Pellat et al. | 455/333 |
| 6,952,334 B2 * | 10/2005 | Ball et al. | 361/93.9 |
| 7,064,529 B2 * | 6/2006 | Telecco | 323/267 |
| 7,154,923 B2 * | 12/2006 | Kucharski | 372/29.015 |

(Continued)

FOREIGN PATENT DOCUMENTS

DE    100 13 208 A1    9/2001
WO    WO 2005/022957 A1    3/2005

OTHER PUBLICATIONS

Chinese Office Action, with English translation, issued in Chinese Patent Application No. 200580049243.4, mailed May 19, 2011.

(Continued)

*Primary Examiner* — Minh D A
(74) *Attorney, Agent, or Firm* — McDermott Will & Emery LLP

(57) ABSTRACT

Novel circuitry and methodology are provided for correcting the offset associated with a voltage-controlled current source. An offset correction circuit is coupled to the current source to prevent the output current produced by the current source from deviating from a desired level. The current source may include a transconductance amplifier or a chopper amplifier, and may be configured to produce a zero or non-zero value of the output current.

20 Claims, 3 Drawing Sheets

(56) References Cited

U.S. PATENT DOCUMENTS

2003/0189461 A1    10/2003   Huijsing et al.
2004/0153681 A1*    8/2004   Cao .............................. 713/400
2005/0057236 A1    3/2005   Telecco

OTHER PUBLICATIONS

Korean Office Action, w/ English translation thereof, issued in Korean Patent Application No. KR 10-2007-7020935 dated May 16, 2011.

* cited by examiner

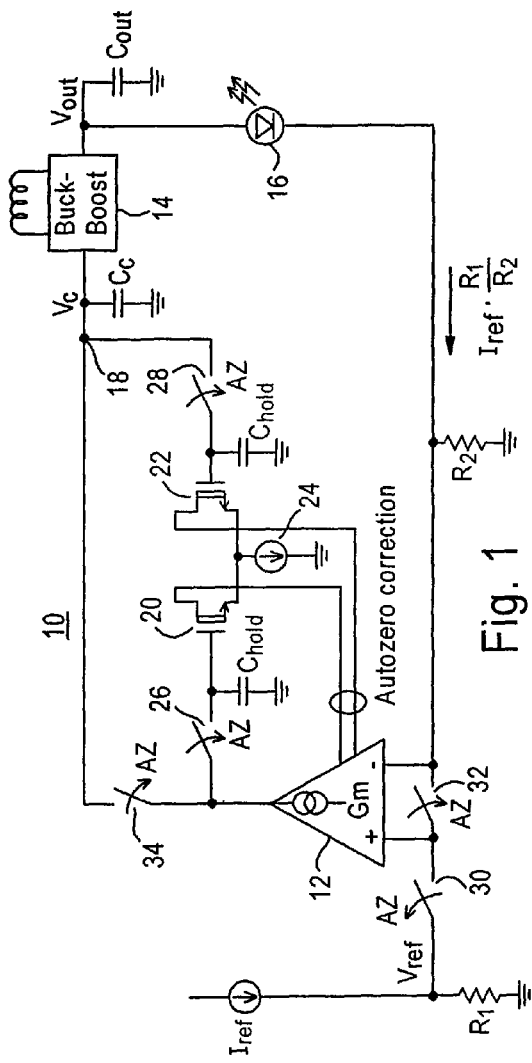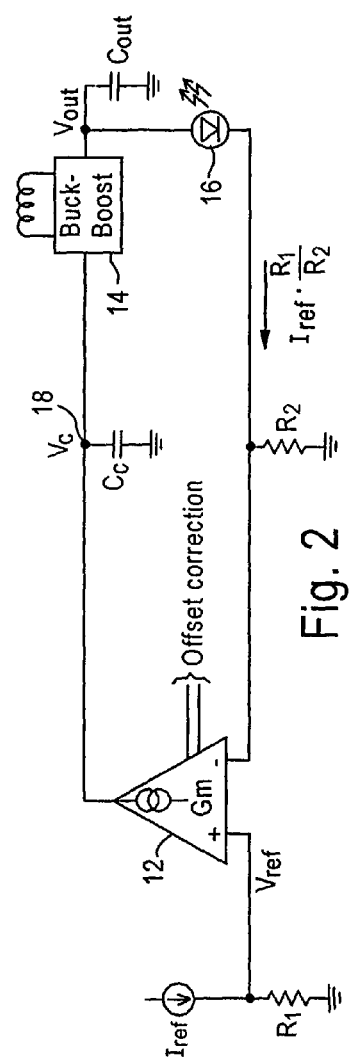

US 8,791,644 B2

OFFSET CORRECTION CIRCUIT FOR VOLTAGE-CONTROLLED CURRENT SOURCE

TECHNICAL FIELD

This disclosure relates to power supply systems, and more particularly, to circuitry and methodology for providing offset correction of a voltage-controlled current source that may serve, for example, as an error amplifier in a buck-boost DC-DC converter regulation loop for a buck-boost light-emitting diode (LED) driver.

BACKGROUND ART

A voltage-controlled current source, such as a transconductance amplifier, may convert a difference between voltages to current. The ideal transfer characteristics of a transconductance amplifier is:

$$I_{out} = G_m(V_{in+} - V_{in-}),$$

where
 $I_{out}$ is current at the output of the amplifier,
 $G_m$ is the transconductance,
 $V_{in+}$ is voltage at the non-inverting input of the amplifier, and
 $V_{in-}$ is voltage at the inverting input.

Hence, the transconductance amplifier produces an output current proportional to a difference between voltages at its inputs. The most simple transconductance amplifier consists of a differential pair to convert the input voltage difference to two currents $I^+$ and $I^-$. These currents are then mirrored to the output so that their difference becomes the output current of the amplifier. Hence, the transconductance amplifier should produce zero net output current, when the same voltages are applied to its inputs.

However, an offset voltage associated with amplifier circuitry itself may affect the output current of the transconductance amplifier. For example, the offset voltage may be caused by dynamic conditions, such as thermal, light and radiation conditions, by differences in the size of the input stage transistors, by differences in the doping and base diffusion of these transistors, by current mirror inaccuracies, and other circuitry imperfections. Due to the offset voltage, the transconductance amplifier may produce some current at its output even when voltages applied to its inputs are the same.

Therefore, there is a need in an offset correction or autozero circuit that would compensate for the offset voltage to produce a correct current value at the output of the transconductance amplifier.

SUMMARY OF THE DISCLOSURE

The present disclosure offers novel circuitry and methodology for correcting the offset associated with a voltage-controlled current source. In particular, an offset correction circuit is coupled to the current source to prevent an output current produced by the current source from deviating from a desired level.

The current source may include a transconductance amplifier, or a chopper amplifier, and may be configured to produce a zero or non-zero value of the output current.

In accordance with an embodiment of the disclosure, the offset correction circuit may comprise a differential pair of transistors, a pair of holding capacitors coupled to respective transistors in the differential pair for holding offset correction information, and a number of switching circuits for switching the current source between a normal mode of operation and an offset correction mode of operation.

For example, during the offset correction operation, inputs of the current source may be connected to each other, and the differential pair may be connected to the current source.

A compensation capacitor may be coupled to the output of the current source for maintaining a voltage at the output at a required level during the offset correction operation.

In accordance with one aspect of the disclosure, the offset correction circuit may be utilized in circuitry for driving a light-emitting diode (LED) that comprises a current source responsive to a signal representing a LED current to produce an output current at a desired level to regulate the LED current. The offset correction circuit is coupled to the current source for correcting an offset voltage applied to the current source, to prevent the output current from deviating from the desired level.

In accordance with a method of the present disclosure, the following steps are carried out for correcting the offset associated with a current source for producing an output current at a level required to maintain a desired value of a regulated current:

supplying a signal representing the regulated current to a first input of the current source, supplying a reference signal representing the desired value of the regulated current to a second input of the current source to produce the output current for maintaining the desired value of the regulated current in a normal operation mode, disconnecting the reference signal from the second input and connecting the second input to the first input to switch to an offset correction mode of operation, and supplying an offset current produced by an offset correction circuit to the current source in the offset correction mode to servo the output of the current source to equal to a required voltage.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein:

FIG. 1 is an exemplary diagram of a buck-boost LED driver of the present disclosure.

FIG. 2 is a diagram illustrating a LED current regulation loop in a normal mode of operation.

DETAILED DISCLOSURE OF THE EMBODIMENTS

Figure 3:
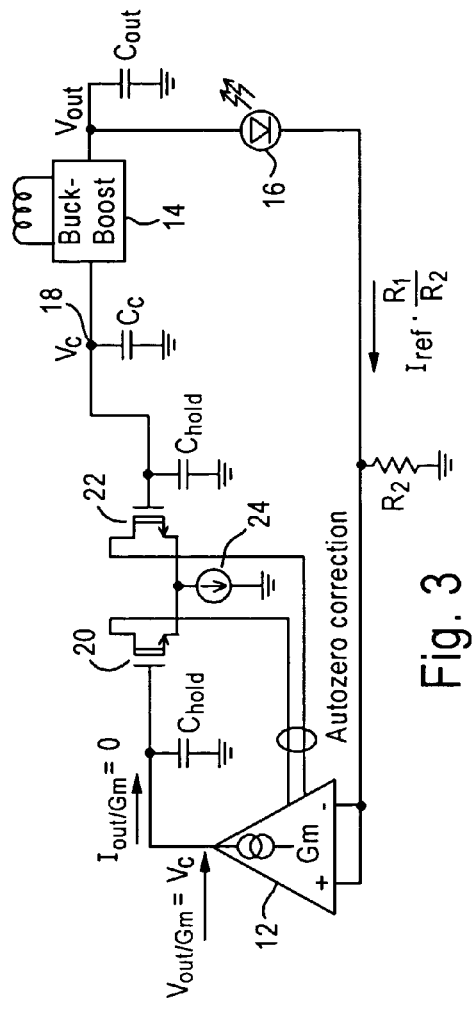
FIG. 3 is a diagram illustrating the driver in an autozero mode of operation.

The present disclosure will be made with the example of a transconductance amplifier that serves as an error amplifier in a buck-boost DC-DC converter regulation loop for a buck-boost LED driver. It will become apparent, however, that the concepts described herein are applicable to any voltage-controlled current source in any power supply system.

FIG. 1 shows a simplified circuit diagram illustrating a buck-boost LED driver 10 including a transconductance amplifier 12 that serves as an error amplifier in a buck-boost DC-DC converter regulation loop. The output of the transconductance amplifier 12 is coupled to a buck-boost DC/DC converter 14 that generates the output voltage required to drive a LED 16 such as a white LED. An example of the buck-boost DC/DC converter is the LTC®3453 buck-boost converter manufactured by Linear Technology Corporation.

In particular, the output of the transconductance amplifier 12 is connected to a voltage compensation node 18. The output of the transconductance amplifier 12 drives a compensation capacitor Cc at the node 18 to ground. As a result, compensation voltage Vc is produced at the node 18. For example, a 1 µF capacitor may be selected as the capacitor Cc. In response to the voltage Vc, the buck-boost converter 14 generates the output voltage Vout applied to the anode of the LED 16. A bypass capacitor Cout may be coupled to the output of the buck-boost DC/DC converter 14.

The cathode of the LED 16 is connected to the inverting input of the transconductance amplifier 12. The non-inverting input of the transconductance amplifier 12 is supplied with reference voltage Vref proportional to a desired value of the LED current. The reference voltage Vref is produced using a reference current source Iref coupled through resistor R1 to ground. The inverting input of the transconductance amplifier 12 is coupled through resistor R2 to ground.

Thus, the regulation loop provided by the transconductance amplifier 12 regulates LED current $I_{LED}$=Iref×R1/R2, instead of the output voltage Vout. The compensation voltage Vc at the output of the transconductance amplifier 12 determines the duty cycle of switches in the buck-boost converter 14 that produces the output voltage Vout equal to the forward voltage drop of the LED 16 at the desired LED current plus the reference voltage Vref. For example, in response to an increasing Vc, the buck-boost converter 14 generates an increasing output voltage Vout.

To achieve the highest efficiency, it is desirable to generate the lowest possible output voltage Vout, which requires the lowest possible reference voltage Vref. However, at lower input voltages of the transconductance amplifier 12, an input-referred offset voltage would result in a relatively larger error in the LED current. Hence, an autozero or offset correction circuit is required to operate the transconductance amplifier 12 at low input voltages.

As discussed above, a transconductance amplifier produces a current at its output in response to a difference between voltages at its inputs. Therefore, a procedure for autozeroing a transconductance amplifier differs from a procedure for autozeroing a voltage amplifier because zero net output current rather than zero output voltage has to be achieved during autozeroing.

In accordance with the present disclosure, a transconductance amplifier autozero circuit comprises a differential pair of MOS transistors 20 and 22. For example, NMOS transistors may be utilized. A holding capacitor $C_{hold}$ is connected to the gate of each of the transistors 20 and 22. For example, 2 pF holding capacitors may be used. A current source 24 is connected to a common node between sources of the transistors 20 and 22. The gate of the transistor 20 via a switching circuit 26 is connected to the output of the transconductance amplifier 12, whereas the gate of the transistor 22 via a switching circuit 28 is connected to the voltage compensation node 18. The drains of the transistors 20 and 22 are connected to offset correction inputs of the transconductance amplifier 12.

Further, the transconductance amplifier autozero circuit includes a switching circuit 30 between the non-inverting input of the transconductance amplifier 12 and the reference voltage Vref. A switching circuit 32 is arranged between the inverting and non-inverting inputs of the transconductance amplifier 12. Also, a switching circuit 34 is provided between the output of the transconductance amplifier 12 and the voltage compensation node 18.

As illustrated in FIG. 2, in a normal mode of operation, the switches 26 and 28 are open to disconnect the output of the transconductance amplifier 12 and the voltage compensation node 18 from the gates of the respective transistors 20 and 22. Further, the switch 30 is closed to connect the non-inverting input of the transconductance amplifier 12 to the reference voltage Vref, and the switch 32 is open to disconnect the non-inverting input from the inverting input. Also, the switch 34 is closed to connect the output of the transconductance amplifier 12 to the voltage compensation node 18. Hence, in the normal mode of operation, the transconductance amplifier 12 operates in a regulation loop to produce an output current in response to a difference between the reference voltage Vref proportional to a desired value of the LED current and the voltage at its non-inverting input proportional to an actual value of the LED current.

As illustrated in FIG. 3, in an autozero or offset correction mode of operation, the switches 26 and 28 are closed to respectively connect the gates of the transistors 20 and 22 to the output of the transconductance amplifier 12 and the voltage compensation node 18. The switch 34 is open to disconnect the output of the transconductance amplifier 12 from the voltage compensation node 18. The switch 32 is closed to connect the non-inverting input of the transconductance amplifier 12 to its inverting input, and the switch 30 is open to disconnect the non-inverting input from the reference voltage Vref.

Hence, in the autozero mode, one input of the differential pair of transistors 20 and 22 is supplied with the voltage Vc, which serves as a reference. The other input of the differential pair is connected to the output of the transconductance amplifier 12, which operates only in response to its input offset voltage. The differential pair injects a differential offset current into the offset correction inputs of the transconductance amplifier 12 to servo the output $V_{out\backslash Gm}$ of the transconductance amplifier 12 to equal to the Vc voltage. The transconductance amplifier 12 produces zero output current $I_{out\backslash Gm}$ since its output is connected only to the high-impedance gate of the transistor 20. The compensation capacitor Cc stores the value of the voltage Vc produced at the voltage compensation node 18 during the normal mode, and enables the buck-boost converter 14 to generate the output voltage required to continue to drive the LED 16 during the autozero mode.

When the transconductance amplifier 12 returns to the normal mode, the differential pair is disconnected from the voltage compensation node 18 and from the output of the transconductance amplifier 12, and the holding capacitors $C_{hold}$ store the value of any offset correction voltage required to compensate for the offset voltage of the transconductance amplifier 12. This voltage value determines the drain currents of transistors 20 and 22 which are applied to the offset correction inputs of the transconductance amplifier 12.

The switches 26, 28, 30, 32 and 34 are controlled by a timing circuit to provide appropriate timing for operations in the normal and autozero modes. For example, the transconductance amplifier 12 may operate for 120 microseconds in the normal mode, and for 8 microseconds in the autozero mode.

Figure 4:
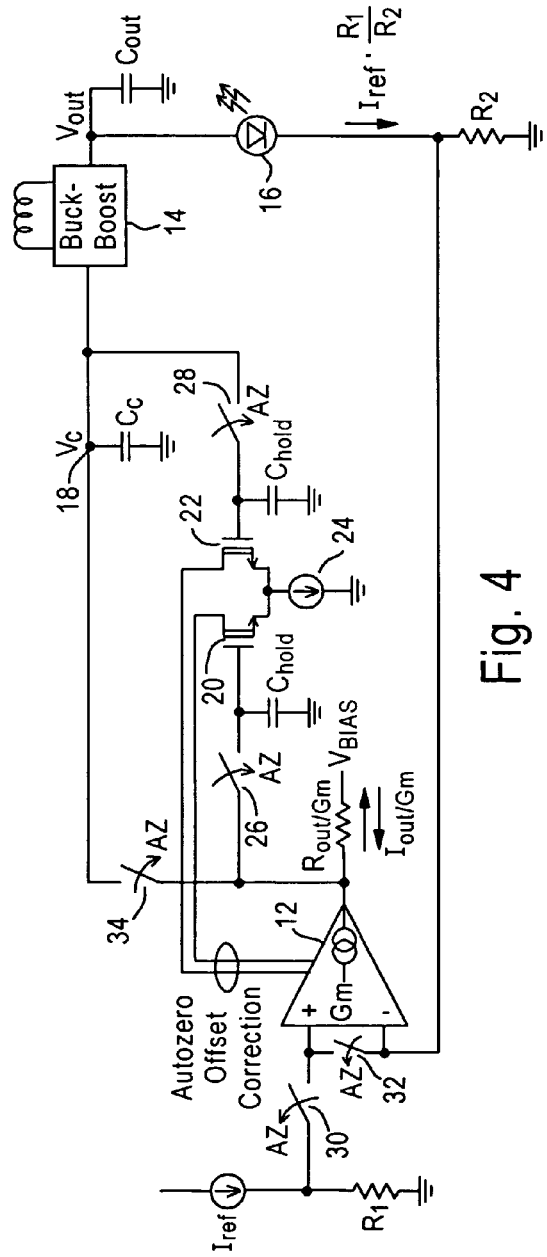
FIG. 4 is an exemplary diagram of a buck-boost LED driver employing an autozero circuit for a transconductance amplifier with a non-zero output current.

FIG. 4 shows an exemplary transconductance amplifier autozero circuit similar to the arrangement illustrated in FIGS. 1-3 but having a bias circuit for providing a DC bias voltage $V_{BIAS}$ to the output of the transconductance amplifier 12 via resistance $R_{out\backslash Gm}$. As a result, during the autozero mode, the output current $I_{out\backslash Gm}$ of the transconductance amplifier 12 may servo to a preset non-zero value.

Figure 5:
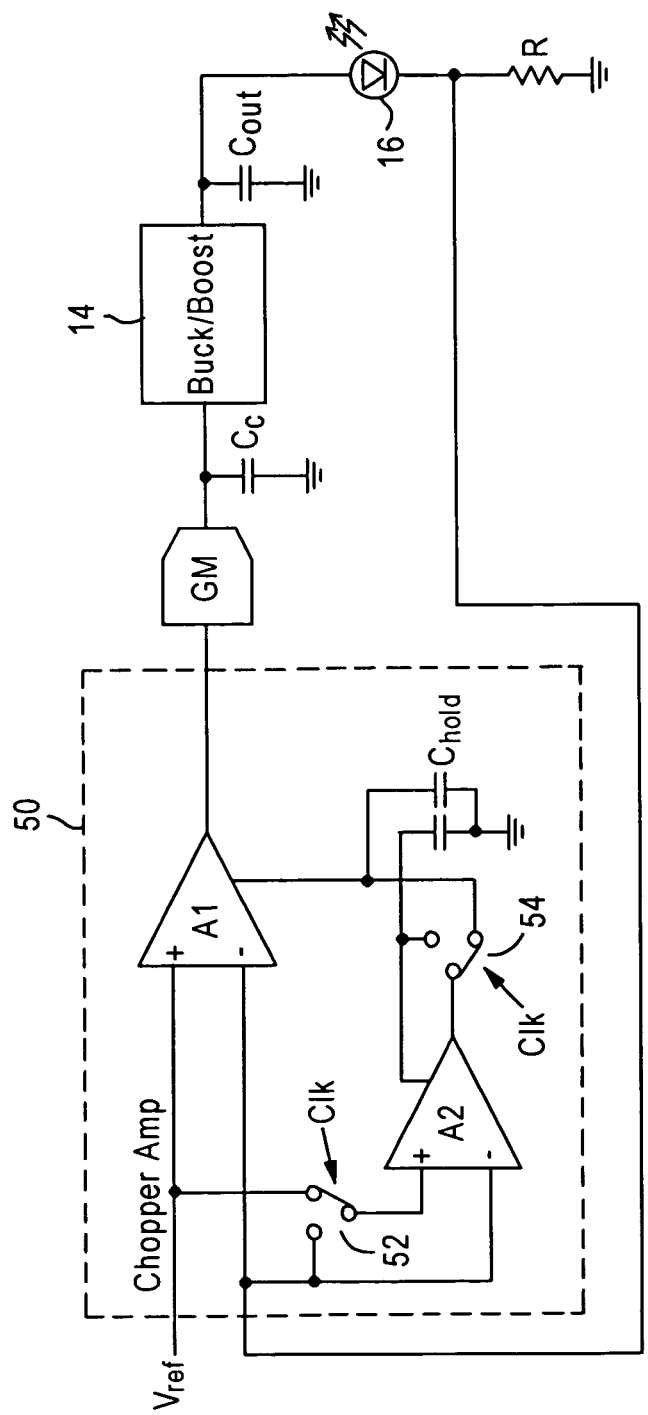
FIG. 5 is a diagram illustrating offset correction in a buck-boost LED driver using a chopper amplifier in a LED current regulation loop.

FIG. 5 illustrates another exemplary embodiment of the present disclosure, in which an autozero circuit provides offset correction in circuitry including a chopper amplifier 50 used as an error amplifier for the buck-boost DC-DC converter 14 that drives the LED 16. The chopper amplifier 50 includes an operational amplifier A1 and an operational amplifier A2. A transconductance amplifier GM may be arranged at the output of the chopper amplifier 50 for providing voltage-to-current conversion.

The autozero circuit includes two holding capacitors $C_{hold}$ always connected between offset correction inputs of the amplifier A1 and the amplifier A2, respectively, and ground. For example, 100 pF capacitors may be used. Also, the autozero circuit includes a switch 52 that connects the non-inverting input of the amplifier A2 either to the non-inverting input of the amplifier A1 or to the inverting input of the amplifier A1, and a switch 54 that connects the output of the amplifier A2 either to the offset correction input of the amplifier A1 or to the offset correction input of the amplifier A2.

In response to the voltage at the output of the GM, the buck-boost converter 14 generates the output voltage Vout applied to the anode of the LED 16. A bypass capacitor Cout may be coupled to the output of the buck-boost DC/DC converter 14. The cathode of the LED 16 is connected to the inverting inputs of the amplifiers A1 and A2, which are also coupled through the resistor R to ground. The non-inverting inputs of the amplifiers A1 and A2 are supplied with reference voltage Vref proportional to a desired value of the LED current.

The chopper amplifier 50 produces a voltage at the output of the amplifier A1 in response to a difference between voltages applied at the inverting and non-inverting inputs. The regulation loop provided by the chopper amplifier 50 regulates LED current $I_{LED}$ by developing voltage at the output of the GM that determines the duty cycle of the switches in the buck-boost converter 14 producing the output voltage Vout equal to the forward voltage drop of the LED 16 at the desired LED current plus the reference voltage Vref.

On one phase of a clock cycle, the switch 52 disconnects the non-inverting input of the amplifier A2 from the non-inverting input of the amplifier A1, and connects the inverting and non-inverting inputs of the amplifier A2. At the same time, the switch 54 disconnects the output of the amplifier A2 from the offset correction input of the amplifier A1 and connects the output of the amplifier A2 to the offset correction input of the amplifier A2. As a result, the offset voltage associated with the amplifier A2 is cancelled. The required correction voltage is held by one of the capacitors $C_{hold}$.

On the opposite phase of the clock cycle, the switch 52 reconnects the non-inverting inputs of the amplifiers A1 and A2, and the switch 54 connects the output of the amplifier A2 to drive the offset correction input of the amplifier A1. As a result, the offset voltage associated with the amplifier A1 is cancelled. The required correction voltage is held by the other capacitor $C_{hold}$.

Hence, the amplifier A1 is active in both phases of the clock cycle providing a continuous LED current regulation system. The chopper amplifier 50 may be controlled by a low-frequency clock signal, for example, at 10 kHz.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. Circuitry for producing an output current, comprising:
   a current source responsive to an input voltage to produce the output current at a desired level, and
   an offset correction circuit coupled to the current source for correcting an offset voltage applied to the current source, to prevent the output current from deviating from the desired level.

2. The circuitry of claim 1, wherein the current source includes a transconductance amplifier.

3. The circuitry of claim 1, wherein the current source includes a chopper amplifier.

4. The circuitry of claim 1, wherein the current source is configured to produce a zero value of the output current.

5. The circuitry of claim 1, wherein the offset correction circuit comprises a differential pair of transistors.

6. The circuitry of claim 5, wherein the offset correction circuit further comprises a pair of holding capacitors coupled to respective transistors in the differential pair for holding offset correction information.

7. The circuitry of claim 6, wherein the offset correction circuit further comprises first switching circuitry for connecting the differential pair to the current source during an offset correction operation.

8. The circuitry of claim 7, wherein the offset correction circuit further comprises second switching circuitry for connecting inputs of the current source to each other during the offset correction operation.

9. The circuitry of claim 7, further comprising a compensation capacitor coupled to the output of the current source for maintaining a voltage at the output of the current source at a required level during the offset correction operation.

10. Circuitry for driving a light-emitting diode (LED), comprising:
    a current source responsive to a signal representing a LED current to produce an output current at a desired level to regulate the LED current, and an offset correction circuit coupled to the current source for correcting an offset voltage applied to the current source, to prevent the output current from deviating from the desired level.

11. The circuitry of claim 10, wherein the current source includes a transconductance amplifier.

12. The circuitry of claim 10, wherein the current source includes a chopper amplifier.

13. The circuitry of claim 10, wherein the current source is configured to produce a zero value of the output current.

14. The circuitry of claim 10, wherein the offset correction circuit comprises a differential pair of transistors.

15. The circuitry of claim 14, wherein the offset correction circuit further comprises a pair of holding capacitors coupled to respective transistors in the differential pair for holding offset correction information.

16. The circuitry of claim 15, further comprising a compensation capacitor coupled to the output of the current source for maintaining a voltage at an output of the current source at a required level during an offset correction operation.

17. A method of correcting offset in a current source for producing an output current at a level required to maintain a desired value of a regulated current, comprising the steps of:

supplying a signal representing the regulated current to a first input of the current source, supplying a reference signal representing the desired value of the regulated current to a second input of the current source to produce the output current for maintaining the desired value of the regulated current in a normal operation mode, disconnecting the reference signal from the second input and connecting the second input to the first input to switch to an offset correction mode of operation, and supplying an offset current to the current source in the offset correction mode.

18. The method of claim 17, wherein the regulated current includes a LED current.

19. The method of claim 17, wherein a zero value of the output current is produced for maintaining the desired value of the regulated current in the normal operation mode.

20. The method of claim 17, wherein an offset correction circuit is connected to the current source in the offset correction mode to produce the offset current.

* * * * *